US012598685B1

(12) United States Patent　　　　(10) Patent No.:　US 12,598,685 B1
Lin et al.　　　　　　　　　　　　　(45) Date of Patent:　　　Apr. 7, 2026

(54) OFF-LINE VOICE LIGHT CONTROL SYSTEM

(71) Applicant: Changzhou Jutai Electronic Co., Ltd., Changzhou (CN)

(72) Inventors: Jun Lin, Changzhou (CN); Chengqian Pan, Changzhou (CN); Min Fang, Changzhou (CN)

(73) Assignee: Changzhou Jutai Electronic Co., Ltd., Changzhou (CN)

( * ) Notice: Subject to any disclaimer, the term of this patent is extended or adjusted under 35 U.S.C. 154(b) by 0 days.

(21) Appl. No.: 19/364,588

(22) Filed: Oct. 21, 2025

(30) Foreign Application Priority Data

Oct. 9, 2025　(CN) .......................... 202522124769.0

(51) Int. Cl.
　*H05B 47/12*　　　(2020.01)
　*G10L 15/18*　　　(2013.01)
　*G10L 15/22*　　　(2006.01)
　*H05B 47/17*　　　(2020.01)

(52) U.S. Cl.
　CPC .......... *H05B 47/12* (2020.01); *G10L 15/1822* (2013.01); *G10L 15/22* (2013.01); *H05B 47/17* (2020.01); *G10L 2015/223* (2013.01)

(58) Field of Classification Search
　CPC ..... H05B 47/12; H05B 47/17; G10L 15/1822; G10L 15/22; G10L 2015/223
　See application file for complete search history.

(56) References Cited

FOREIGN PATENT DOCUMENTS

CN　　　118870615 A　* 10/2024　............. H05B 45/20

* cited by examiner

*Primary Examiner* — Henry Luong

(57)　　　　ABSTRACT

An off-line voice light control system is provided, including: a pickup unit for picking up a voice signal of a user; a voice recognition unit configured to parse the voice signal and output a command signal, where the voice recognition unit is electrically connected to the pickup unit; a lighting mode switching unit for generating a lighting mode signal after parsing the command signal provided by the voice recognition unit, where the lighting mode switching unit is electrically connected to the voice recognition unit; and a switch unit controlled by the lighting mode signal to be enabled and disabled, where the switch unit is electrically connected to the lighting mode switching unit; where an output end of a step-down direct-current power conversion chip is respectively connected to a cathode terminal of a fly-wheel diode and one end of a first inductor.

9 Claims, 4 Drawing Sheets

2/4

OFF-LINE VOICE LIGHT CONTROL SYSTEM

CROSS-REFERENCE TO RELATED APPLICATION

This application claims priority from the Chinese patent application 202522124769.0 filed Oct. 9, 2025, the content of which is incorporated herein in the entirety by reference.

TECHNICAL FIELD

The present disclosure relates to the field of lighting technologies, in particular to an off-line voice light control system.

BACKGROUND

Voice control lights are voice control electronic lighting apparatuses. The voice control electronic lighting apparatus has a characteristic of simple and flexible operation, and is a sensitively controlled voice control light. The voice control light uses a signal control voice generated by a mouth for about 1 second, so that a voice control lighting apparatus can be turned on and off conveniently and timely, and has an automatic delay turn-off function of preventing a false trigger. Some of the apparatuses are provided with a manual switch, so that application of the apparatus is more convenient.

An existing voice controller for an LED includes an LED light emitting mode control unit, a voice forwarding unit, a first transfer unit, and a conversion unit. The voice forwarding unit picks up and converts a voice control command sent by a user into a voice frequency signal to be output. The first transfer unit transfers the voice frequency signal output by the voice forwarding unit. The conversion unit converts the voice frequency signal into a control command that enables the LED light emitting mode control unit to be recognizable and then outputs the control command to the first transfer unit. The LED light emitting mode control unit receives the control command sent by the first transfer unit and then outputs a control signal for controlling the LED, or the voice forwarding unit receives the control command sent by the first transfer unit and then outputs the control command to the LED light emitting mode control unit. The LED light emitting mode control unit receives the control command and then outputs the control signal for controlling the LED.

The foregoing LED may be controlled by the voice controller, but the foregoing controller needs to be controlled by networking. To transfer a signal among multiple devices, multiple devices are used, which not only is high in costs, but also needs transmission for voice parsing and command sending by using multiple links, which has a defect of a slow response speed.

At present, there are also some control circuits of lamp switches that can be controlled without networking. However, these circuits are complex in circuits, and generally, can only be connected to a power supply with an input voltage of 5 V. Therefore, the foregoing control circuit has a relatively large limitation.

SUMMARY

The present disclosure provides an off-line voice light control system which can be adapted to a wide-range voltage.

The technical scheme for solving the technical problem is as follows.

An off-line voice light control system includes:

a pickup unit for picking up a voice signal of a user;

a voice recognition unit configured to parse the voice signal and output a command signal, where the voice recognition unit is electrically connected to the pickup unit;

a lighting mode switching unit for generating a lighting mode signal after parsing the command signal provided by the voice recognition unit, where the lighting mode switching unit is electrically connected to the voice recognition unit; and a switch unit, that is enabled and disabled, controlled by the lighting mode signal, where the switch unit is electrically connected to the lighting mode switching unit; where the system further includes a step-down direct-current power conversion chip, a fly-wheel diode, a first inductor and a second capacitor that are configured to store energy, an output end of the step-down direct-current power conversion chip is respectively connected to a cathode terminal of the fly-wheel diode and one end of the first inductor, an anode terminal of the fly-wheel diode is grounded, the other end of the first inductor is respectively connected to one end of the second capacitor, the voice recognition unit, and the lighting mode switching unit, and the other end of the second capacitor is grounded.

In the present disclosure, when a voltage is loaded into an input end of the step-down direct-current power conversion chip, a voltage of the step-down direct-current power conversion chip decreases, for example, from 30 V to 5 V to be output, a current of the first inductor linearly increases. In addition, a first capacitor is charged, and a working voltage is provided for the pickup unit and the voice recognition unit. After the 30V voltage provided to the input end of the step-down direct-current power conversion chip is cut off, electric energy accumulated by the first inductor is discharged by using the fly-wheel diode, a current on the first inductor linearly decreases, and an output voltage is discharged by using the first capacitor. In the present disclosure, a high-voltage direct current is converted into a low-voltage direct current by using a function of the step-down direct-current power conversion chip, and requirements of the voice recognition unit and the lighting mode switching unit are met by using functions of the fly-wheel diode, the first inductor, and the second capacitor.

DETAILED DESCRIPTION OF THE EMBODIMENTS

The present disclosure is further described in detail in conjunction with the following drawings and specific implementations.

Figure 1:
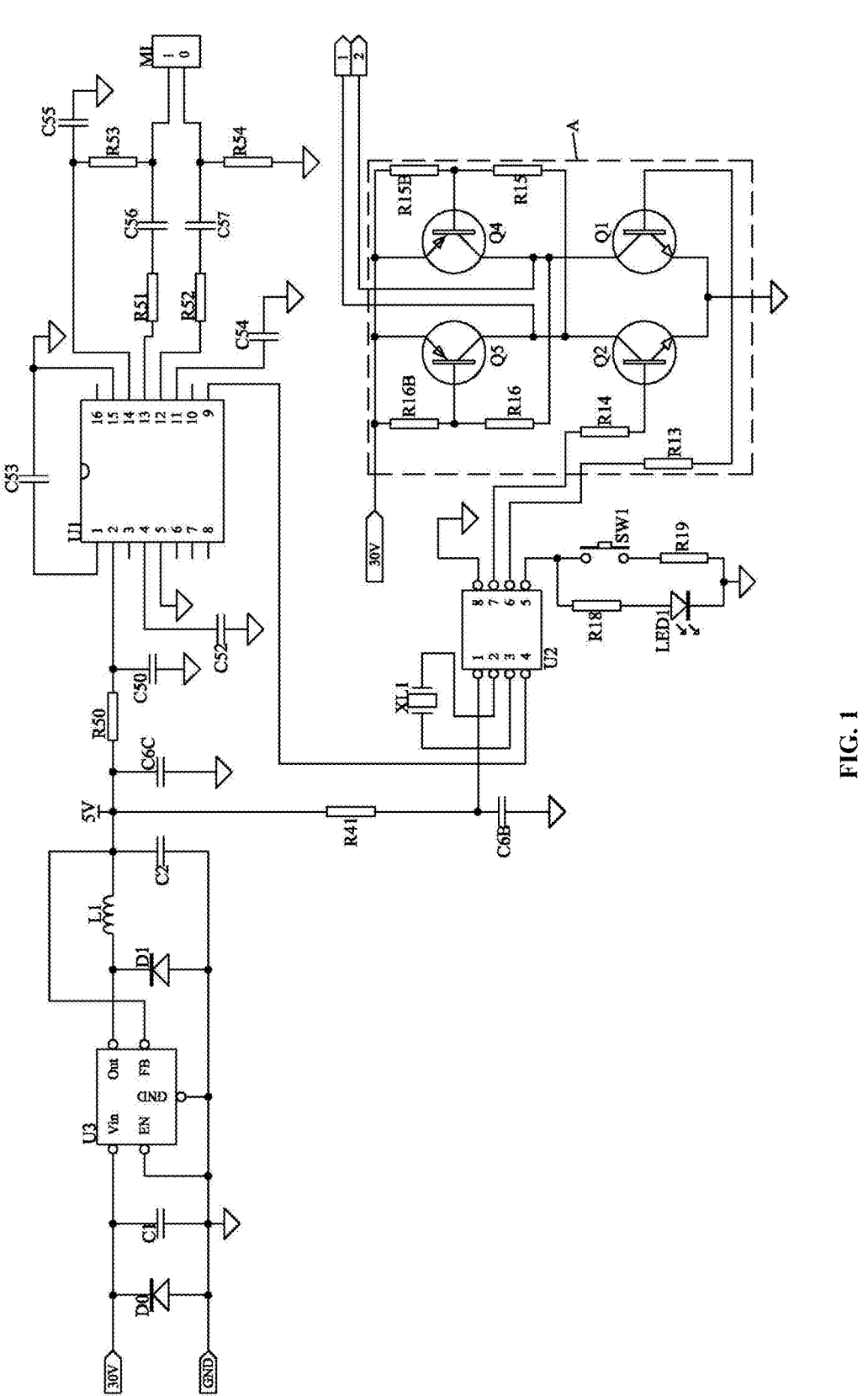
FIG. 1 is a schematic circuit diagram of a first type of off-line voice light control system.

As shown in FIG. 1, an off-line voice light control system in the present disclosure includes a pickup unit for picking up a voice signal of a user, a voice recognition unit, a lighting mode switching unit, a switch unit, a step-down direct-current power conversion chip U3, a fly-wheel diode D1, and a first inductor L1 and a second capacitor C2 configured to store energy. In the present disclosure, a type of the step-down direct-current power conversion chip U3 is XL1509, an output end of the step-down direct-current power conversion chip U3 is respectively connected to a cathode terminal of the fly-wheel diode D1 and one end of the first inductor L1, an anode terminal of the fly-wheel diode D1 is grounded, the other end of the first inductor L1 is respectively connected to one end of the second capacitor C2, the voice recognition unit, and the lighting mode switching unit, and the other end of the second capacitor C2 is grounded. In the present disclosure, a first capacitor C1 and an anti-reverse connection diode DO are further disposed at an input end of the step-down direct-current power conversion chip U3, a cathode terminal of the anti-reverse connection diode DO, one end of the first capacitor, and an input end of the step-down direct-current power conversion chip U3 are connected in parallel to an output end of a direct-current voltage, and an anode terminal of the anti-reverse connection diode DO and the other end of the first capacitor C1 are grounded.

The direct-current voltage in the present disclosure is a 30 V direct-current voltage. When a voltage is loaded into an input end of the step-down direct-current power conversion chip U3, a 30 V voltage of the step-down direct-current power conversion chip U3 decreases to 5 V to be output, a current of the first inductor L1 linearly increases. In addition, a first capacitor C1 is charged, and a working voltage is provided for the pickup unit and the voice recognition unit. After the 30V voltage provided to the input end of the step-down direct-current power conversion chip U3 is cut off, electric energy accumulated by the first inductor L1 is discharged by using the fly-wheel diode D1, a current on the first inductor L1 linearly decreases, and an output voltage is discharged by using the first capacitor C1. In the present disclosure, a high-voltage direct current is converted into a low-voltage direct current by using a function of the step-down direct-current power conversion chip 3, and requirements of the voice recognition unit and the lighting mode switching unit are met by using functions of the fly-wheel diode D1, the first inductor L1, and the second capacitor C2.

The pickup unit includes a pickup component MI, a fifty-third resistor R53, a fifty-fourth resistor R54, a fifty-fifth capacitor C55, a fifty-sixth capacitor C56, a fifty-seventh capacitor C57, and a fifty-first resistor R51 and a fifty-second resistor R52 for resisting interference. One end of the fifty-third resistor R53 and one end of the fifty-sixth capacitor C56 are connected in parallel to the pickup component MI. The other end of the fifty-third resistor R53 is connected to one end of the fifty-fifth capacitor C55. The other end of the fifty-fifth capacitor C55 is grounded. The other end of the fifty-sixth capacitor C56 is connected to one end of the fifty-first resistor R51. The other end of the fifty-first resistor R51 is connected to the voice recognition unit. One end of the fifty-fourth resistor R54 and one end of the fifty-seventh capacitor C57 are connected in parallel to the pickup component MI. The other end of the fifty-fourth resistor R54 is grounded. The other end of the fifty-seventh capacitor C57 is connected to one end of the fifty-second resistor R52. The other end of the fifty-second resistor R52 is connected to the voice recognition unit.

In this embodiment, the pickup part MI picks up and outputs two voice signals, and the two voice signals are respectively converted from current signals to voltage signals by using the third resistor R53 and the fifty-fourth resistor R54. One voltage signal is provided to the voice recognition unit after harmonic cancellation by using the fifty-sixth capacitor C56 and the fifty-first resistor R51, the other voltage signal is provided to the voice recognition unit after the harmonic cancellation by using the fifty-seventh capacitor C57 and the fifty-second resistor R52, and the two voltage signals are coupled in the voice recognition unit.

The voice recognition unit is configured to parse the voice signal and output a command signal, where the voice recognition unit is electrically connected to the pickup unit. The voice recognition unit includes an anti-interference capacitor C6C, a first current limiting resistor R50, a first filter capacitor C50, a voice recognition chip U1, a second filter capacitor C52, a third filter capacitor C53, and a fourth filter capacitor C54. One end of the anti-interference capacitor C6C and one end of the first current limiting resistor R50 are connected in parallel to the other end of the first inductor L1. The other end of the first current limiting resistor R50 and one end of the first filter capacitor C50 are connected in parallel to a second pin of the voice recognition chip U1. One end of the second capacitor C52 is connected to a fourth pin of the voice recognition chip U1. One end of the third filter capacitor C53 is connected to a first pin of the voice recognition chip U1. One end of the fourth filter capacitor C54 is connected to an eleventh pin of the voice recognition chip U1. The other ends of the anti-interference capacitor C6C, the first filter capacitor C50, the second filter capacitor C52, the third filter capacitor C53, and the fourth filter capacitor C54 are grounded. A ninth pin of the voice recognition chip U1 is an output end, and the output end is connected to the lighting mode switching unit. The other end of the fifty-first resistor R51 is connected to a thirteenth pin of the voice recognition chip U1, and the other end of the fifty-second resistor R52 is connected to a twelfth pin of the voice recognition chip U1.

The lighting mode switching unit generates a lighting mode signal after parsing the command signal provided by the voice recognition unit, where the lighting mode switching unit is electrically connected to the voice recognition unit. The lighting mode switching unit includes a second current limiting resistor R41, a sixth filter capacitor C6B, a lighting mode control chip U2, and a crystal oscillator XL1. One end of the second current limiting resistor R41 is connected to the other end of the first inductor L1. The other end of the second current limiting resistor R41 and one end of the sixth filter capacitor C6B are connected in parallel to a first pin of the lighting mode control chip U2. The other end of the sixth filter capacitor C6B is grounded. One end of the crystal oscillator XL1 is connected to a second pin of the lighting mode control chip U2. The other end of the crystal oscillator XL1 is connected to the first pin of the lighting mode control chip U2. A fourth pin of the lighting mode control chip U2 is connected to the voice recognition unit. A sixth pin and a seventh pin of the lighting mode control chip U2 are respectively connected to the switch unit.

The lighting mode switching unit further includes a key switch SW1, an eighteenth resistor R18, a nineteenth resistor R19, and an indicator light LED1. One end of the key switch SW1 and one end of the eighteenth resistor R18 are connected in parallel to a fifth pin of the lighting mode control chip U2. The other end of the key switch SW1 is connected to one end of the nineteenth resistor R19. The other end of the eighteenth resistor R18 is connected to one end of the indicator light LED1. The other ends of the nineteenth resistor R19 and the indicator light LED1 are grounded. A lighting mode switching command may be sent to the lighting mode control chip U2 by switching on the key switch SW1 momentarily, and a control command that realizes regular working of a lamp may be sent to the lighting mode control chip U2 by switching on the key switch SW1 for a long time. The regular working is the prior art, and unnecessary details are not described herein.

The switch unit A is electrically connected to the lighting mode switching unit. The lamp is electrically connected to an output end of the switch unit A. The switch unit A is controlled by the lighting mode signal to be enabled and disabled, so as to generate an electric duty cycle signal, so that the lamp connected to the output end of the switch unit A generates a lighting effect corresponding to the duty cycle signal. A structure of the switch unit A is the prior art, and details are not described herein.

A voice parsing program is built in the voice recognition chip U1. After a voice is decoded by the voice recognition chip U1, the output command signal is a string of codes, and different codes are different working modes. Multiple lighting mode control programs are stored in the lighting mode control chip U2. After receiving a corresponding code, the lighting mode control chip U2 invokes a lighting mode control program matched with the code, so that a lighting mode control command is generated by using the control program. The lighting mode control command is output to the switch unit A, so that the switch unit A generates a duty ratio signal, and the lamp connected to the output end of the switch unit A generates a lighting effect corresponding to the duty ratio signal.

Figure 2:
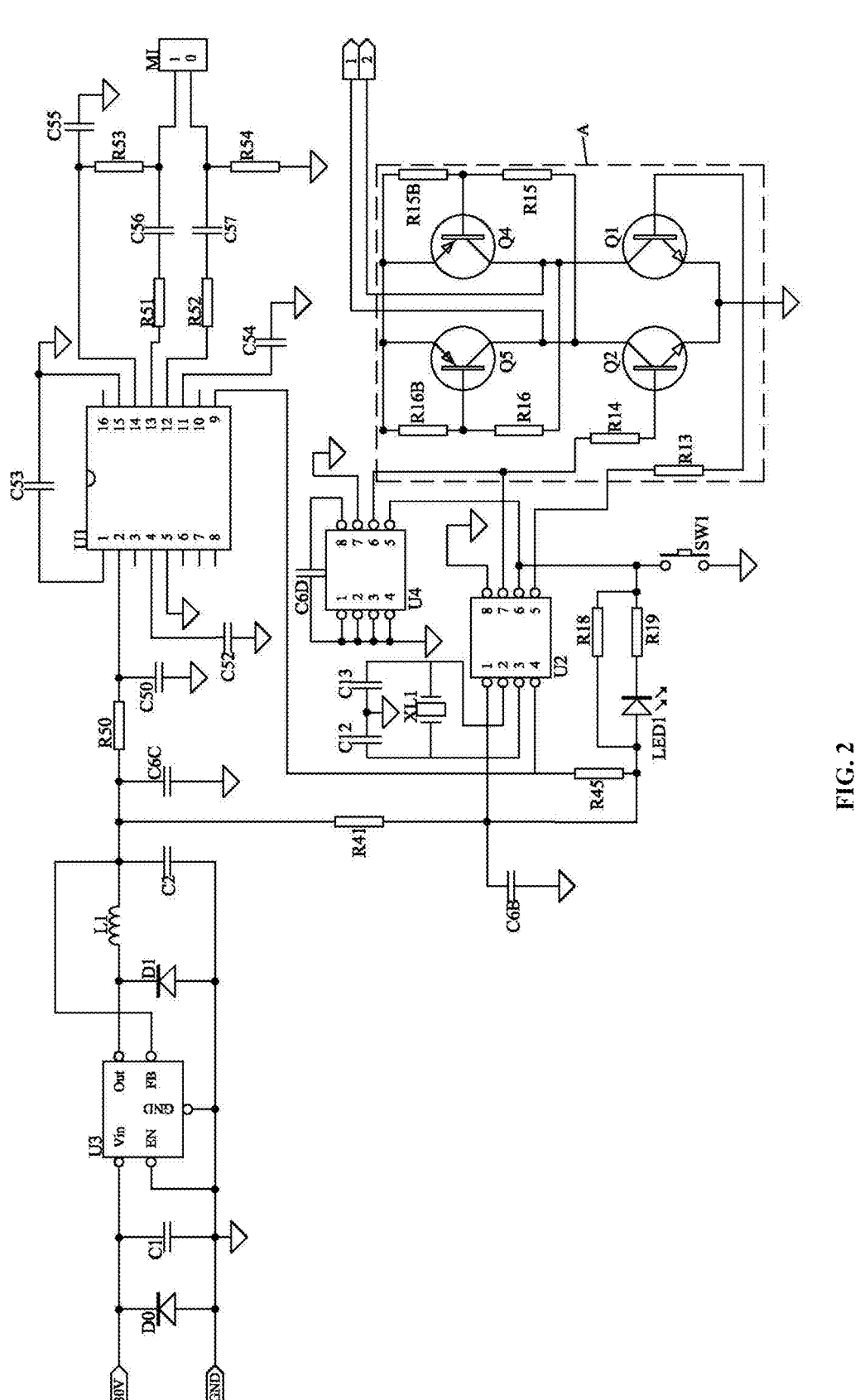
FIG. 2 is a schematic circuit diagram of a second type of off-line voice light control system.

As shown in FIG. 2, differences between this type of circuit and the first type of off-line voice light control system as shown in FIG. 1 lie in that the system further includes a memory unit configured to record a lighting mode control command currently output by the lighting mode switching unit, where the memory unit is electrically connected to the lighting mode switching unit. The memory unit includes a storage chip U4 and a filter capacitor C6D. A first pin to a fourth pin of the storage chip U4 are grounded. A fifth pin of the storage chip U4 is connected to a sixth pin of the lighting mode control chip U2. A sixth pin of the storage chip U4 is connected to a seventh pin of the lighting mode control chip U2. A seventh pin of the storage chip U4 is grounded. An eighth pin of the storage chip U4 is connected to one end of the filter capacitor C6D. The other end of the filter capacitor C6D is grounded.

During operation, the storage chip U4 acquires and stores the lighting mode control command currently output by the lighting mode control chip U2. After the 30 V direct-current voltage is powered off, the lighting mode control command currently output by the lighting mode control chip U2 is stored in the storage chip U4. After the system is powered on, the lighting mode control chip U2 directly reads the lighting mode control command stored in the storage chip U4, and is configured to control the load to work by taking the lighting mode control command as an output signal.

Figure 3:
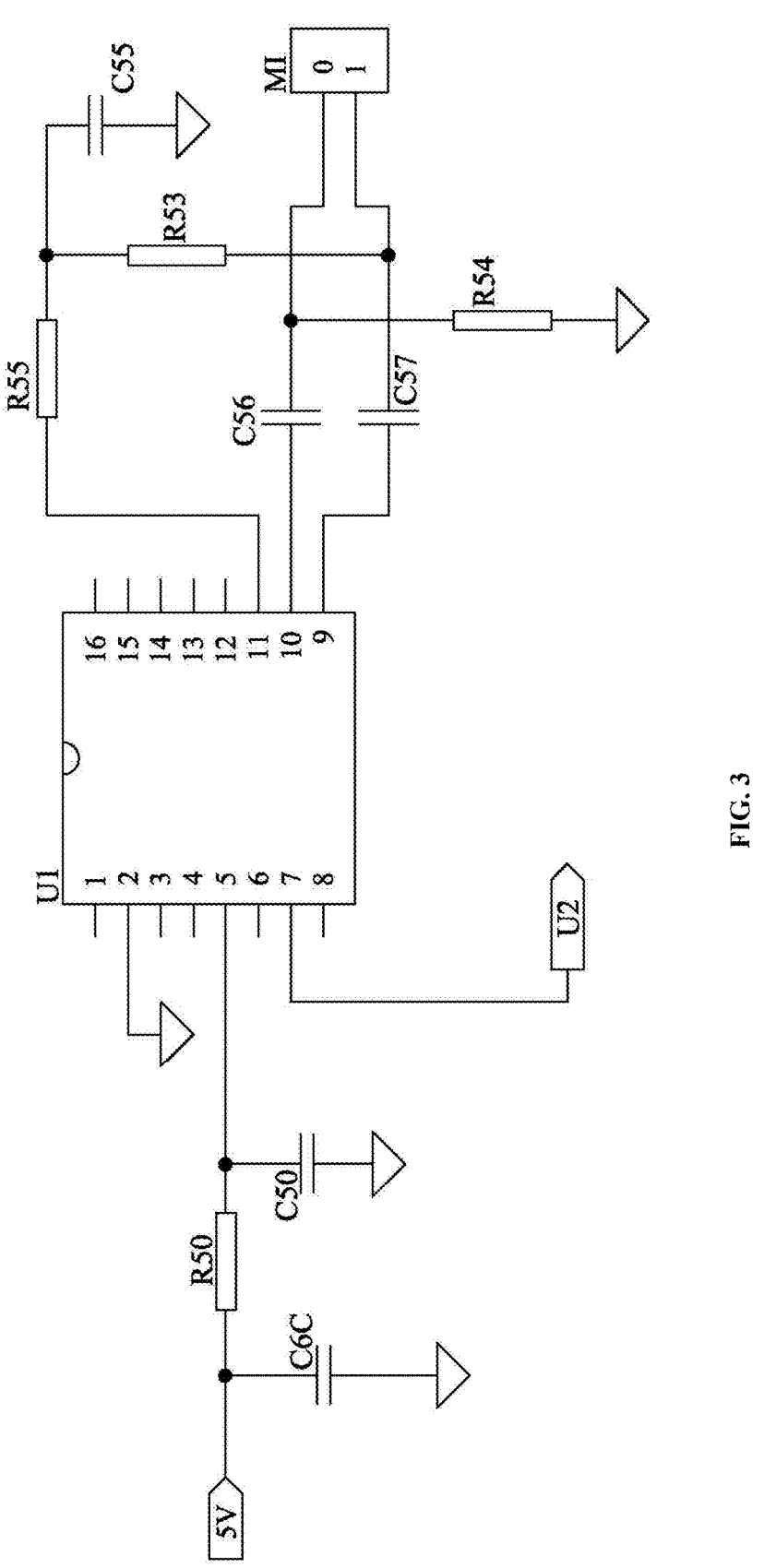
FIG. 3 is a schematic circuit diagram of a pickup unit and a voice recognition unit in a third type of off-line voice light control system.

As shown in FIG. 3, differences between this type of circuit and the first type of off-line voice light control system as shown in FIG. 1 lie in that the pickup unit includes the pickup unit includes a pickup component MI, a fifty-third resistor R53, a fifty-fourth resistor R54, a fifty-fifth resistor R55, a fifty-fifth capacitor C55, a fifty-sixth capacitor C56, and a fifty-seventh capacitor C57. One end of the fifty-third resistor R53 and one end of the fifty-seventh capacitor C57 are connected in parallel to the pickup component MI, one end of the fifty-fifth resistor R55 and one end of the fifty-fifth capacitor C55 are respectively connected to the other end of the fifty-third resistor R53, the other end of the fifty-fifth resistor R55 is connected to the voice recognition unit, and the other end of the fifty-fifth capacitor C55 is grounded. One end of the fifty-fourth resistor R54 and one end of the fifty-sixth capacitor C56 are connected in parallel to the pickup component MI, the other end of the fifty-fourth resistor R54 is grounded, and the other end of the fifty-seventh capacitor C57 is connected to the voice recognition unit.

Figure 4:
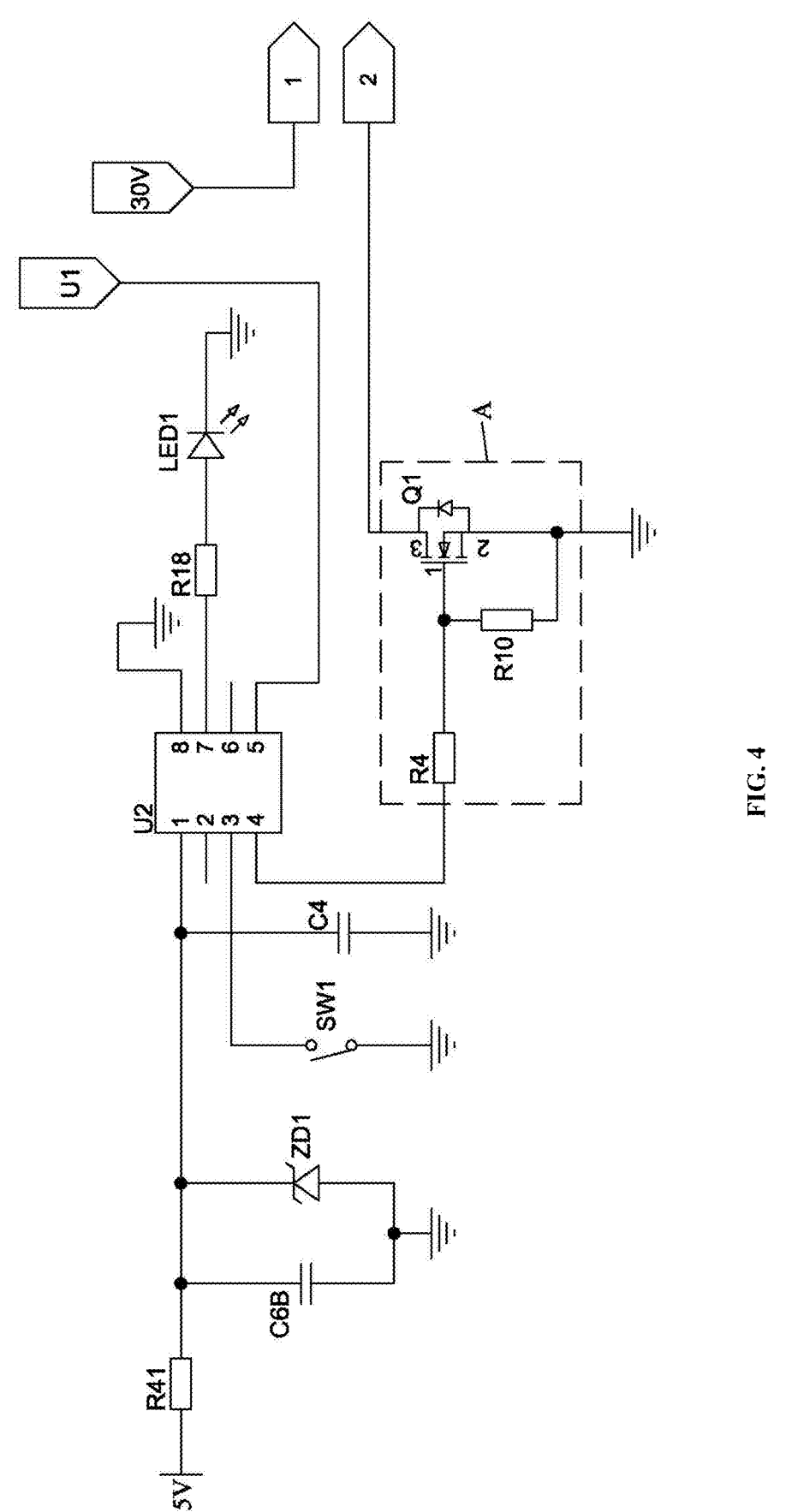
FIG. 4 is a schematic circuit diagram of a lighting mode switching unit and a switch unit in a fourth type of off-line voice light control system.

As shown in FIG. 4, differences between this type of circuit and the first type of off-line voice light control system as shown in FIG. 1 lie in that the lighting mode switching unit includes a second current limiting resistor R41, a sixth filter capacitor C6B, a voltage stabilizing diode ZD1, a fourth filter capacitor C4, and a lighting mode control chip U2. One end of the second current limiting resistor R41 is connected to the other end of the first inductor L1. The other end of the second current limiting resistor R41, one end of the sixth filter capacitor C6B, one end of the voltage stabilizing diode ZD1, and one end of the fourth filter capacitor C4 are connected in parallel to a first pin of the lighting mode control chip U2. The other ends of the sixth filter capacitor C6B, the voltage stabilizing diode ZD1 and the fourth capacitor C4 are grounded. The voltage stabilizing diode ZD1 facilitates to stabilize the voltage provided to the lighting mode control chip U2. The fourth filter capacitor C4 may filter interference signals in the voltage. The fifth pin of the lighting mode control chip U2 is connected to the voice recognition unit, and the fourth pin of the lighting mode control chip U2 is connected to the switch unit A.

The switch unit A includes a fourth resistor R4, a tenth resistor R10, and a transistor Q1. One end of the fourth resistor R4 is connected to the fourth pin of the lighting mode control chip U2, and the other end of the fourth resistor R4 is respectively connected to a first pin of the transistor Q1 and one end of the tenth resistor R10. A second pin of the transistor Q1 and the other end of the tenth resistor R10 are grounded. The transistor Q1 is an MOS transistor or a triode.

On the basis of the foregoing several ways, an input end of each type of circuit may be connected to a power converter. The power converter may be an AC/DC power converter, or a DC/AC power converter. For example, an alternating current of 220 V or 110 V is converted into a direct current of 30 V or other low voltages (such as 24 V or 12 V), or a direct current of 48 V is converted into a direct current of 30 V or other low voltages (such as 24 V or 12 V).

What is claimed is:

1. An off-line voice light control system, comprising:
a pickup unit for picking up a voice signal of a user;
a voice recognition unit configured to parse the voice signal and output a command signal, wherein the voice recognition unit is electrically connected to the pickup unit;
a lighting mode switching unit for generating a lighting mode signal after parsing the command signal provided by the voice recognition unit, wherein the lighting mode switching unit is electrically connected to the voice recognition unit; and
a switch unit (A) controlled by the lighting mode signal to be enabled and disabled, wherein the switch unit (A) is electrically connected to the lighting mode switching unit; wherein
the off-line voice light control system further comprises a step-down direct-current power conversion chip (U3), a fly-wheel diode (D1), a first inductor (L1) and a second capacitor (C2) that are configured to store energy, an output end of the step-down direct-current power conversion chip (U3) is respectively connected to a cathode terminal of the fly-wheel diode (D1) and one end of the first inductor (L1), an anode terminal of the fly-wheel diode (D1) is grounded, the other end of the first inductor (L1) is respectively connected to one end of the second capacitor (C2), the voice recognition unit, and the lighting mode switching unit, and the other end of the second capacitor (C2) is grounded.

2. The off-line voice light control system according to claim 1, wherein the pickup unit comprises a pickup component (MI), a fifty-third resistor (R53), a fifty-fourth resistor (R54), a fifty-fifth capacitor (C55), a fifty-sixth capacitor (C56), a fifty-seventh capacitor (C57), and a fifty-first resistor (R51) and a fifty-second resistor (R52) for resisting interference;

one end of the fifty-third resistor (R53) and one end of the fifty-sixth capacitor (C56) are connected in parallel to the pickup component (MI), the other end of the fifty-third resistor (R53) is connected to one end of the fifty-fifth capacitor (C55), the other end of the fifty-fifth capacitor (C55) is grounded, the other end of the fifty-sixth capacitor (C56) is connected to one end of the fifty-first resistor (R51), and the other end of the fifty-first resistor (R51) is connected to the voice recognition unit;

one end of the fifty-fourth resistor (R54) and one end of the fifty-seventh capacitor (C57) are connected in parallel to the pickup component (MI), the other end of the fifty-fourth resistor (R54) is grounded, the other end of the fifty-seventh capacitor (C57) is connected to one end of the fifty-second resistor (R52), and the other end of the fifty-second resistor (R52) is connected to the voice recognition unit.

3. The off-line voice light control system according to claim 1, wherein the voice recognition unit comprises an anti-interference capacitor (C6C), a first current limiting resistor (R50), a first filter capacitor (C50), a voice recognition chip (U1), a second filter capacitor (C52), a third filter capacitor (C53), and a fourth filter capacitor (C54), one end of the anti-interference capacitor (C6C) and one end of the first current limiting resistor (R50) are connected in parallel to the other end of the first inductor (L1), the other end of the first current limiting resistor (R50) and one end of the first filter capacitor (C50) are connected in parallel to a second pin of the voice recognition chip (U1), one end of the second capacitor (C52) is connected to a fourth pin of the voice recognition chip (U1), one end of the third filter capacitor (C53) is connected to a first pin of the voice recognition chip (U1), one end of the fourth filter capacitor (C54) is connected to an eleventh pin of the voice recognition chip (U1), and the other ends of the anti-interference capacitor (C6C), the first filter capacitor (C50), the second filter capacitor (C52), the third filter capacitor (C53), and the fourth filter capacitor (C54) are grounded.

4. The off-line voice light control system according to claim 1, wherein the lighting mode switching unit comprises a second current limiting resistor (R41), a sixth filter capacitor (C6B), a lighting mode control chip (U2), and a crystal oscillator (XL1), one end of the second current limiting resistor (R41) is connected to the other end of the first inductor (L1), the other end of the second current limiting resistor (R41) and one end of the sixth filter capacitor (C6B) are connected in parallel to a first pin of the lighting mode control chip (U2), one end of the crystal oscillator (XL1) is connected to a second pin of the lighting mode control chip (U2), the other end of the crystal oscillator (XL1) is connected to the first pin of the lighting mode control chip (U2), a fourth pin of the lighting mode control chip (U2) is connected to the voice recognition unit, and a sixth pin and a seventh pin of the lighting mode control chip (U2) are respectively connected to the switch unit.

5. The off-line voice light control system according to claim 4, wherein the lighting mode switching unit further comprises a key switch (SW1), an eighteenth resistor (R18), a nineteenth resistor (R19), and an indicator light (LED1), one end of the key switch (SW1) and one end of the eighteenth resistor (R18) are connected in parallel to a fifth pin of the lighting mode control chip (U2), the other end of the key switch (SW1) is connected to one end of the nineteenth resistor (R19), the other end of the eighteenth resistor (R18) is connected to one end of the indicator light (LED1), and the other ends of the nineteenth resistor (R19) and the indicator light (LED1) are grounded.

6. The off-line voice light control system according to claim 1, further comprising a memory unit configured to record a lighting mode control command currently output by the lighting mode switching unit, wherein the memory unit is electrically connected to the lighting mode switching unit.

7. The off-line voice light control system according to claim 1, wherein the pickup unit includes the pickup unit includes a pickup component (MI), a fifty-third resistor (R53), a fifty-fourth resistor (R54), a fifty-fifth resistor (R55), a fifty-fifth capacitor (C55), a fifty-sixth capacitor (C56), and a fifty-seventh capacitor (C57), One end of the fifty-third resistor (R53) and one end of the fifty-seventh capacitor (C57) are connected in parallel to the pickup component (MI), one end of the fifty-fifth resistor (R55) and one end of the fifty-fifth capacitor (C55) are respectively connected to the other end of the fifty-third resistor (R53), the other end of the fifty-fifth resistor (R55) is connected to the voice recognition unit, and the other end of the fifty-fifth capacitor (C55) is grounded, One end of the fifty-fourth resistor (R54) and one end of the fifty-sixth capacitor (C56) are connected in parallel to the pickup component (MI), the other end of the fifty-fourth resistor (R54) is grounded, and the other end of the fifty-seventh capacitor (C57) is connected to the voice recognition unit.

8. The off-line voice light control system according to claim 1, wherein the lighting mode switching unit includes a second current limiting resistor (R41), a sixth filter capacitor (C6B), a voltage stabilizing diode (ZD1), a fourth filter capacitor (C4), and a lighting mode control chip (U2), One end of the second current limiting resistor (R41) is connected to the other end of the first inductor (L1), The other end of the second current limiting resistor (R41), one end of the sixth filter capacitor (C6B), one end of the voltage stabilizing diode (ZD1), and one end of the fourth filter capacitor (C4) are connected in parallel to a first pin of the lighting mode control chip (U2), The other ends of the sixth filter capacitor (C6B), the voltage stabilizing diode (ZD1) and the fourth capacitor (C4) are grounded, The fifth pin of the lighting mode control chip (U2) is connected to the voice recognition unit, and the fourth pin of the lighting mode control chip (U2) is connected to the switch unit (A).

9. The off-line voice light control system according to claim 1, wherein the switch unit (A) includes a fourth resistor (R4), a tenth resistor (R10), and a transistor (Q1), One end of the fourth resistor (R4) is connected to the fourth pin of the lighting mode control chip (U2), and the other end of the fourth resistor (R4) is respectively connected to a first pin of the transistor (Q1) and one end of the tenth resistor (R10), a second pin of the transistor (Q1) and the other end of the tenth resistor (R10) are grounded.

\* \* \* \* \*